(12) United States Patent
Bongers-Ambrosius et al.

(10) Patent No.: US 6,719,072 B2
(45) Date of Patent: Apr. 13, 2004

(54) SUCTION DRILL UNIT FOR DOWEL ANCHORAGE IN ROCK

(75) Inventors: Hans-Werner Bongers-Ambrosius, Munich (DE); Tim Pröls, München (DE)

(73) Assignee: Hilti Aktiengesellschaft, Schann (LI)

( * ) Notice: Subject to any disclaimer, the term of this patent is extended or adjusted under 35 U.S.C. 154(b) by 60 days.

(21) Appl. No.: 10/072,719

(22) Filed: Feb. 6, 2002

(65) Prior Publication Data
US 2002/0104687 A1 Aug. 8, 2002

(30) Foreign Application Priority Data
Feb. 7, 2001 (DE) .......................... 101 05 408

(51) Int. Cl.[7] ................................ B28D 1/26
(52) U.S. Cl. .................. 175/213; 173/198; 408/67
(58) Field of Search .................. 175/213, 73, 198; 408/67, 58

(56) References Cited

U.S. PATENT DOCUMENTS 4,964,475 A * 10/1990 Fischer ............... 175/210
4,964,476 A * 10/1990 Fischer ............... 175/213

* cited by examiner

*Primary Examiner*—David Bagnell
*Assistant Examiner*—Jennifer R. Dougherty
(74) *Attorney, Agent, or Firm*—Sidley Austin Brown & Wood, LLP

(57) ABSTRACT

A suction drill unit for the installation of a drill dowel (2) into rock, concrete, masonry and similar materials has an insertion end (3) for insertion into an at least partially rotary and percussive acting hand tool drilling device, with a reduced diameter shank (7) having an open suction passageway (9) extending axially through the shank (7) towards a bit head (8) and a rearward radial communication passage (10) connected thereto for suction-tight communication with a non-rotary suction head (11), wherein the drill bit head (8) is formed with an eccentrically arranged bit head tip (12) for boring of a hole (14) having a diameter (D) greater than that of the drill bit head diameter (B).

5 Claims, 1 Drawing Sheet

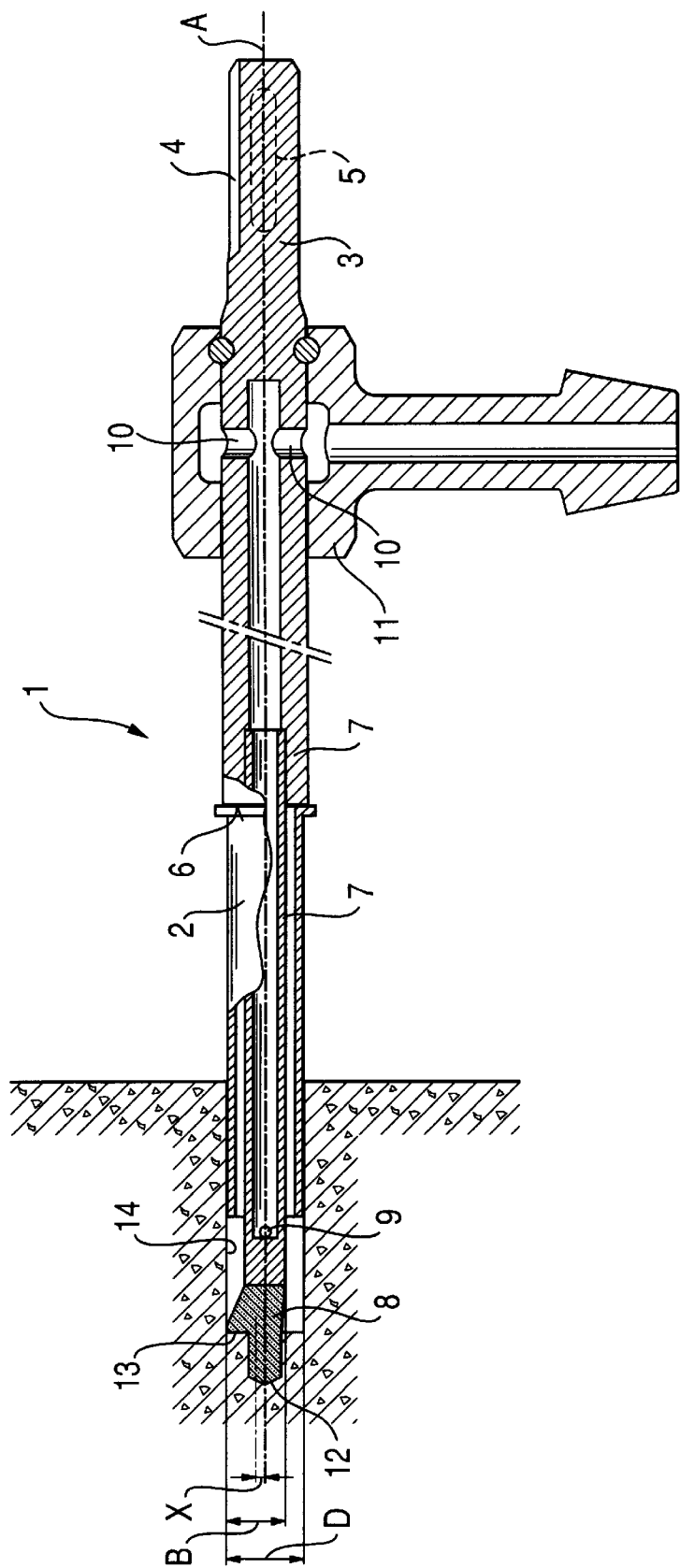

SUCTION DRILL UNIT FOR DOWEL ANCHORAGE IN ROCK

FIELD OF THE INVENTION

The invention relates to a suction drill unit mounted in an at least partially rotary and percussive acting hand tool for the anchorage of a dowel in rock or rocklike material, such as concrete and masonry.

BACKGROUND OF THE INVENTION

Drills for hand tools exhibit at one end an insertion end with rotary driver grooves and locking grooves for receiving the drill tool in the hand tool chuck.

For installing dowels, a drill dowel externally radially surrounding the drill and abutting at an axial stop collar is installed into the bore hole simultaneously when drilling a hole of greater diameter than that of the drill head and the drill bit is subsequently removed. A conventionally longitudinally slit, tubular drill dowel made of sheet metal is radially compressed when being installed and thus elastically radially stressed.

According to DE2548100 rock suction drills are disclosed for hand tools.

According to U.S. Pat. No. 4,635,738 a drill head formed of hard material is mounted on a bit shank and has an eccentrically arranged drill bit tip for boring a hole larger than the bit head diameter along with flushing liquid channels extending longitudinally to the bit head, whereby a drill wash channel passes through the bit head and radially and axially flushing liquid channels are formed.

EP0878261A1 discloses a helical drill bit for installing drill dowels that has an insertion end with rotary drive slots and locking slots, a tapered helical shank with a stop collar and a cutting edge with an eccentrically arranged pilot tip made of hard material for drilling a hole larger than the drill head diameter. The limited quantity of drilled material at the drill head is conveyed by a spiral grooved flute situated between the helical bit and the drill dowel and causes a limitation at higher bore output.

SUMMARY OF THE INVENTION

The primary object of the present invention is to provide an increase in the amount of cutting material conveyed during drill dowel installation or an increase in drilling performance. Another object relates to the increase of the service life of the drill bit and improved anchorage of the drill dowel.

Essentially, a suction drill unit is comprised of an insertion end for receipt into an at least partially rotary and percussive acting hand drilling tool device with a reduced diameter shank with a suction passageway running at least partially longitudinally along the shank and a radial connection opening secured thereto for the tight connection with a non-rotary suction head and an eccentrically arranged drill bit head for drilling of a hole larger than that of the drill bit head diameter, whereby the suction passageway opens adjacent the drill bit head.

In a tubular suction drill bit, compared to a helical drill bit with comparable pressure and torque resistance, at a given bore hole diameter there is a greater conveyance section available for removal of drilled material, whereby the quantity conveyed is further adjustable by the suction pressure and thus is independent of the speed. Due the structural enhancement of the tube compared to the helical shank, the increase in resistance and rigidity under variable flexure and due to the increase in fastening surface area between the drill bit head and the shank the service life of the drill is increased. On the other hand, at identical material stressing of the drill, thicker walled and thus radially more rigid dowels can be installed, since there is no requirement of available space for drilled material dust or cuttings. Furthermore, on removal there is no abraded, loose material pressed between the dowel and the walls of the bore hole, whereby the frictional-locking fit of the drill dowel in the bore hole is enhanced.

Advantageously, the suction passageway exits immediately behind the bit head transverse to the tool axis and out of the reduced diameter shank.

Because of the arrangement of the suction aperture immediately behind the bit head, the drilled material can be suctioned off between the bit head and the dowel into an axially extending space that is formed substantially inwardly of the bore hole walls and within the shank.

The bit head is advantageously comprised entirely of hard material or is inset with a hard material, whereby the penetration of the drilling head tip into the material to be excavated is improved and wear is reduced.

Further advantageously, the drilling head exhibits an advantageous single, recessed main cutting edge, whereby the eccentric bit tip, acting as a pilot cutting edge, assures effective guidance of the suction bit.

BRIEF DESCRIPTION OF THE DRAWING

The invention is more completely explained with reference to an exemplary embodiment read together with a drawing of a suction drill bit for dowel installation.

DETAILED DESCRIPTION OF THE INVENTION

According to the drawing a suction drill unit 1 for installation of a drill dowel 2 into rock has an insertion end 3 with a rotary drive slot 4 and a locking slot or keyway 5 for insertion into a drilling tool chuck. In a reduced diameter axially extending shank 7 a circumferential unilaterally axial stop collar 6 is formed and there is a suction passageway 9 extending partially axially, and opening through an aperture exiting immediately behind the drill bit head, opposite the drilling direction, and a radially arranged communicating opening 10 in an axial continuation of the passageway 9 and connected thereto for tight connection with a non-rotary suction head 11, which is non-rotationally coaxially tightly mounted on the shank 7. The drill bit head 8 is arranged on the leading end of the shank 7 and is eccentrically positioned at an offset X to the axis A of the drilling tool. The drill bit tip 12 of the bit head 8 is formed as a pilot tip with a single, main cutting edge 13 spaced rearwardly from the tip 12 for boring a hole 14 with a diameter D larger than that of the bit head diameter B.

What is claimed is:

1. A suction drill unit for installing an axially extending dowel member (2) into one of rock, concrete, masonry and similar hard materials, said suction drill unit (1) being elongated and having an elongated axis (A) with a leading end (12) and a trailing end, said trailing end forming an insertion end (3) for insertion into a chuck of an at least partially rotating and percussive acting drilling tool, an axially extending tubular shank (7) inserted into and forming at one end the leading end (12) of said suction drill unit (1), said tubular shank (7) having an outside diameter smaller than a diameter of said dowel member (2), a drill bit head (8)

mounted on and forming the a leading end of said shank (7), said shank (7) forming a first section of a suction passageway (9) extending axially therethrough in said suction drilling unit to a blank end adjacent said drill bit head (8), a second section of said suction passageway (9) in said suction drill unit (1) forming an axial continuation of the first section of said suction passageway (9) and terminating in a non-rotary suction head (11) mounted on said suction drill unit (1) for suction tight communication with a radially extending opening (10) in the second section of such suction passageway (9) said drill bit head (8) comprises an eccentric leading bit head tip at said leading end (12) having a diameter (B) smaller than a diameter (D) of a hole drilled by said drill bit head (8).

2. A suction drill unit, as set forth in claim 1, wherein a suction opening from the first section of said suction passageway (9) is located rearwardly adjacent said drill bit head (8) and extending radially through said tubular shank (7) transversely of the axis (A).

3. A suction drill unit, as set forth in claim 1, wherein said drill bit head (8) is formed of one of entirely hard material and an insert of hard material.

4. A suction drill unit, as set forth in claim 1, wherein said drill bit head (8) comprises said leading bit head tip (12) and a main cutting edge (13) spaced axially rearwardly of and eccentrically from said tip (12).

5. A suction drill unit, as set forth in claim 4, wherein a single said main cutting edge (13) extends partly around said drill bit head (8) and radially outwardly of said tip (12).

* * * * *